(12) United States Patent
Giancotti et al.

(10) Patent No.: US 10,151,244 B2
(45) Date of Patent: Dec. 11, 2018

(54) MODULAR GAS TURBINE PLANT WITH A HEAVY DUTY GAS TURBINE

(71) Applicant: Nuovo Pignone Srl, Florence (IT)

(72) Inventors: Marco Giancotti, Florence (IT); Stefano Caverni, Florence (IT)

(73) Assignee: Nuovo Pignone Srl, Florence (IT)

( * ) Notice: Subject to any disclaimer, the term of this patent is extended or adjusted under 35 U.S.C. 154(b) by 374 days.

(21) Appl. No.: 14/406,328

(22) PCT Filed: Jun. 7, 2013

(86) PCT No.: PCT/EP2013/061844
§ 371 (c)(1),
(2) Date: Dec. 8, 2014

(87) PCT Pub. No.: WO2013/182697
PCT Pub. Date: Dec. 12, 2013

(65) Prior Publication Data
US 2015/0184591 A1   Jul. 2, 2015

(30) Foreign Application Priority Data

Jun. 8, 2012   (IT) ................. FI2012A0114

(51) Int. Cl.
*F02C 7/20*   (2006.01)
*F01D 25/28*   (2006.01)
(Continued)

(52) U.S. Cl.
CPC ............... *F02C 7/20* (2013.01); *F01D 15/10* (2013.01); *F01D 25/28* (2013.01); *F16M 1/04* (2013.01);
(Continued)

(58) Field of Classification Search
CPC .......... F02C 7/20; F01D 25/28; F01D 25/285; F16M 1/04; F16M 5/00; F16M 7/00; F16M 9/00
See application file for complete search history.

(56) References Cited

U.S. PATENT DOCUMENTS 4,050,660 A * 9/1977 Eggmann ............... F01D 25/28
                                                          248/676
4,487,014 A   12/1984 Vinciguerra
(Continued)

FOREIGN PATENT DOCUMENTS

CN    88100638 A      8/1988
DE    102009052748 A1 5/2011
(Continued)

OTHER PUBLICATIONS

Unofficial English translation of Office Action issued in connection with corresponding CN Application No. 201380030058.4 dated Sep. 2, 2015.
(Continued)

*Primary Examiner* — Andrew Nguyen
(74) *Attorney, Agent, or Firm* — GE Global Patent Operation

(57) ABSTRACT

A transportable gas turbine module including a baseplate supporting at least a gas turbine and a load drivingly connected to the gas turbine. The module further comprises a structure surrounding the gas turbine and the load and connected to the baseplate. The baseplate is designed such that it can support a heavy duty as turbine having a rated power of not less than 80 MW.

25 Claims, 15 Drawing Sheets

(51) Int. Cl.
*F16M 5/00* (2006.01)
*F16M 1/04* (2006.01)
*F01D 15/10* (2006.01)

(52) U.S. Cl.
CPC .......... *F16M 5/00* (2013.01); *F05D 2260/12* (2013.01); *Y10T 29/49229* (2015.01)

(56) References Cited

U.S. PATENT DOCUMENTS

| | | | | |
|---|---|---|---|---|
| 4,492,085 | A | * | 1/1985 | Stahl ................ F01K 17/06 60/649 |
| 4,501,973 | A | | 2/1985 | Fenemore et al. |
| 5,085,396 | A | | 2/1992 | Mansson |
| 5,626,468 | A | * | 5/1997 | Muir ................. F04B 35/002 248/639 |
| 6,449,957 | B1 | | 9/2002 | Takamatsu et al. |
| 7,036,318 | B1 | | 5/2006 | Munson |
| 7,819,375 | B1 | * | 10/2010 | Johansen ............. F16M 7/00 248/188.2 |
| 2003/0014961 | A1 | * | 1/2003 | Lawlor ............... F01D 1/04 60/39.35 |
| 2003/0061819 | A1 | * | 4/2003 | Kuroki .............. F01D 25/285 60/797 |
| 2007/0131839 | A1 | * | 6/2007 | Dunn ................. B63H 21/16 248/637 |
| 2010/0095683 | A1 | * | 4/2010 | Glynn ............... F01D 25/28 60/796 |

FOREIGN PATENT DOCUMENTS

| | | |
|---|---|---|
| GB | 1150147 A | 4/1969 |
| GB | 2360747 A | 10/2001 |
| JP | S46-5931 Y1 | 3/1971 |
| JP | S57-186025 A | 11/1982 |
| JP | S58-24699 A | 2/1983 |
| JP | H01-69845 U | 5/1989 |
| JP | H04-49300 U | 4/1992 |
| JP | H08-82227 A | 3/1996 |
| JP | H11-173107 A | 6/1999 |
| JP | 2000009293 A | 1/2000 |
| JP | 2007-205143 A | 8/2007 |
| JP | 2009-052551 A | 3/2009 |
| JP | 4346763 B2 | 10/2009 |
| JP | 2010-121498 A | 6/2010 |
| JP | 2011-047404 A | 3/2011 |
| JP | 2011-197006 A | 10/2011 |
| RU | 2263807 C2 | 11/2005 |

OTHER PUBLICATIONS

Unofficial English Translation of Italian Search Report and Opinion issued in connection with corresponding IT Application No. FI20120114 dated Jan. 31, 2013.

PCT Search Report and Written Opinion issued in connection with corresponding PCT Application No. PCT/EP2013/061844 dated Oct. 18, 2013.

Inozemtsev et al., "Machinery building", Gas Turbine Engines, Moscow, vol. No. 03, pp. 174, 2007.

Unofficial English Translation of Russian Office Action issued in connection with corresponding RU Application No. 2014147782 dated Apr. 14, 2017.

Machine Translation and Notification of Reasons for Refusal issued in connection with corresponding JP Application No. 2015-515543 dated Aug. 8, 2017.

* cited by examiner

STATE OF THE ART

MODULAR GAS TURBINE PLANT WITH A HEAVY DUTY GAS TURBINE

FIELD OF THE INVENTION

The embodiments disclosed herein relate to gas turbine plants. More specifically, some disclosed embodiments concern a gas turbine power plant, i.e. a gas turbine generator plant, including a gas turbine as a prime mover, which drives into rotation a load including an electric generator.

DESCRIPTION OF THE RELATED ART

Gas turbines are widely used as prime movers in power generation or industrial plants, for driving electric generators or other rotary machines, such as compressors. In off-shore installations, aeroderivative gas turbines are often used, due to their compact structure and reduced overall dimensions. Commonly, aeroderivative gas turbines are modularized. The gas turbine and the load are arranged on a common frame, thus forming a single unit which is tested in the erection and testing yard or site prior to being transported to final destination. The common frame is then transported to final destination and mounted on a skid. A modular arrangement of this kind is particularly useful, since it allows complete assembling and testing of the rotary machines prior to shipping and installation to final destination.

Large gas turbines, so-called heavy duty gas turbines, are usually not modularized due to their large dimensions. Commonly, the various components of a gas turbine plant are transported separately from the site of manufacturing to the final destination. The foundation is prepared at the final site of destination and the individual machines are then mounted on the foundation. Due to the different radial dimensions of the various plant components, such as the gas turbine, the electric generator and the starter, the foundation is sometimes designed with machine-supporting surfaces at various different levels. The rotary machines must then be aligned, mechanically connected and tuned. The entire process is extremely time-consuming.

FIG. 1 schematically illustrates a known gas turbine power generator plant according to the current art. The plant, globally designated 1, includes a gas turbine 2, an electric generator 3, and an. auxiliary equipment unit 4, including a starter. An air intake system 6 is arranged above the auxiliary equipment unit 4 and is connected to the gas turbine 2 through an intake air duct 7. A common foundation 8 is provided, on which each individual rotary machine is separately installed.

SUMMARY

According to an embodiment, a transportable gas turbine module is provided, comprising: a baseplate supporting at least a gas turbine and a load drivingly connected to said gas turbine; a structure surrounding said gas turbine and said load and connected to said baseplate; wherein said gas turbine is a heavy duty gas turbine having a rated power of not less than 80 MW, e.g. comprised between 80MW and 150 MW, and in some embodiments, not less than 100 MW, e.g. between 100 MW and 150MW.

The load generally includes at least one rotary machine, e.g. a compressor, such as a refrigerant compressor for liquefied natural gas (LNG) applications. In some embodiments, the gas turbine drives an electric generator. The gas turbine and electric generator unit is usually named GTG module, i.e. gas turbine generator module.

According to another embodiment, a transportable gas turbine module is provided, comprising: a baseplate supporting at least a gas turbine and a load (e.g. an electric generator) drivingly connected to the gas turbine; a structure surrounding the gas turbine and the load and connected to the baseplate; wherein the baseplate comprises a plurality of longitudinal beams, extending parallel to a direction of a rotation axis of the gas turbine, and a plurality of transverse beams, extending transversely to said rotation axis, said longitudinal beams and said transverse beams defining a primary lattice structure, on which said gas turbine and said load are placed.

In some embodiments, the baseplate is a transportable structure made of metal beams, e.g. welded to form a one-piece lattice structure.

In some embodiments, the gas turbine and the electric generator are mounted on the baseplate with the interposition of supporting members. For example, the gas turbine can be placed on a turbine baseplate, interposed between the turbine casing and the main baseplate of the module. The electric generator can be arranged on a generator supporting arrangement. One or both the gas turbine and the electric generator can be provided with angular adjusting members, arranged and configured to adjust the inclination of the gas turbine, the electric generator, or both. The angular adjusting members can comprise spherical washers placed under the gas turbine casing and/or under the electric generator casing. The use of inclination adjusting members allows the machines to be re-aligned after transportation on the final site of destination. The large metal baseplate required to house the heavy duty gas turbine, the electric generator, the auxiliary facilities as well as the structure surrounding the machines can undergo deformations during removal from the foundation at the erection and testing yard, transportation and positioning on the foundation at the final destination. The angular adjusting members offer the possibility of re-adjusting the machines such that the rotary shafts thereof are re-aligned.

In some embodiments, the gas turbine and the load are placed on a pair of said longitudinal beams, The pair of longitudinal beams, on which the gas turbine and the load are placed, are for example located in an intermediate position in said lattice structure forming the baseplate or part thereof, at least one external longitudinal beam being arranged on each side of said pair of longitudinal beams supporting the gas turbine and the load. A lattice-structured baseplate is thus obtained, which is capable of housing the main machinery (gas turbine and load, e.g. a electric generator, turbine starter) as well as the auxiliary facilities, and which is capable of being lifted from the foundation of the erection and testing yard and transported, e.g. on a ship, and to be finally anchored on the foundation, e.g. a reinforced-concrete foundation, at the final destination.

The use of several parallel longitudinal beams, the central ones being arranged for supporting the main machinery, allows also sufficient space for lifting and moving trailers to be placed under the module for lifting and transporting the module.

The transverse beams and the longitudinal beams define a top planar surface of the baseplate on which the rotary machines are arranged. In some embodiments, intermediate supporting and connecting structures or elements are arranged between the top planar surface of the baseplate and the individual rotary machines. The height of these structures or elements is such that the machines are arranged coaxial.

In some embodiments, the transverse beams and at least said pair of longitudinal beams, on which the rotary machines are placed, have substantially the same height and define a bottom planar surface of the baseplate, said bottom planar surface forming a rest face of the module on foundation. The lateral longitudinal beams, i.e. those arranged on the sides of the baseplate, can have a reduced vertical dimension, i.e. a reduced height, in order to reduce the overall costs and weight of the baseplate.

In some embodiments the baseplate is divided into baseplate sections, said baseplate sections being aligned to one another in a direction parallel to the rotation axis of the gas turbine and connected to one another to form a rigid baseplate structure. A stiff module having a large longitudinal dimension can thus be obtained by connecting, e.g. by welding, several such sections one adjacent to the other.

The transverse beams of the primary lattice structure of the baseplate have a length corresponding to a width of the baseplate. Conversely, in some embodiments, each longitudinal beam is formed by a plurality of longitudinal beam portions or sections, aligned along the longitudinal dimension of the baseplate, i.e. parallel to the rotation axis of the gas turbine and of the load. Each longitudinal beam portion extends from a first one to a second one of consecutively arranged transverse beams. The longitudinal beam portions of each longitudinal beam can be connected to one another by welding to the intermediate transverse beams.

The primary lattice structure of the baseplate can have substantially rectangular meshes. In at least some of the meshes of the primary lattice structure of the baseplate, secondary lattice structure can be provided. The secondary lattice structure can be formed by transverse secondary beams, running parallel to the transverse beams of the primary lattice structure, and/or by longitudinal secondary beams, running parallel to the longitudinal beams of the primary lattice structure.

In at least some of the meshes of the primary lattice structure, bracings or braces can be arranged. The bracings can be arranged in a plane parallel to the planar top surface formed by the primary lattice structure. In some embodiments, the bracings are inclined with respect to both the longitudinal beams and the transverse beams.

In some embodiments, the transverse beams and the longitudinal beams forming the primary lattice structure comprise a central web welded to upper and lower flanges.

The gas turbine can be constrained to a frame or turbine baseplate, the latter being in turn constrained to the main baseplate of the gas turbine module. In some embodiments the turbine baseplate is connected to the baseplate of the module through a plurality of feet. In some embodiments, the feet are in turn constrained to a pair of said longitudinal beams. Spherical washers or other alignment adjusting members can be provided between the turbine baseplate and the feet, for adjusting the inclination of the gas turbine with respect to the baseplate of the module. In some embodiments, under the gas turbine auxiliary transverse connection beams can be provided, transversely connecting the pair of longitudinal beams on which the gas turbine rests.

In some embodiments, the load is placed on supports constrained to the pair of intermediate longitudinal beams supporting the rotary machines. In some embodiments the load supports extend parallel to the transverse beams of the primary lattice structure of the module baseplate. Spherical washers or other alignment adjusting members can be provided between the load and the supports.

According to a different aspect, the present disclosure also refers to an on-shore gas turbine plant, in particular a gas turbine power plant comprising a gas turbine module as described above, and a foundation. The foundation has a planar surface of support for the gas turbine module. The planar surface of support is discontinuous and the foundation has channels or empty spaces between adjacent plinths running parallel to the longitudinal beams of the module baseplate. The channels are arranged and configured for the insertion of lifting and moving trailers. In some embodiments the foundation has external side walls or plinths rows and at least one intermediate wall or plinth row. When the gas turbine and the load, e.g. the electric generator, are supported on a pair of adjacent longitudinal beams of the module baseplate, the pair of longitudinal beams are configured and arranged such as to rest on the internal wall or plinth. The transverse beams of the module baseplate rest on the internal wall or plinth and on the side walls, plinths or plinths rows. Additional external longitudinal beams, running sideways of the central pair of longitudinal beams on which the rotary machines are placed, are arranged on top of the side walls, or side plinths.

In some embodiments the plinths or walls comprise recesses housing sole plates grouted in the recesses. The sole plates form resting surfaces for the baseplate, in particular for the transverse beams and the longitudinal beams forming the primary lattice structure of the baseplate. Vertical anchoring of the baseplate on the foundation can be obtained by stud bolts grouted in the foundation and arranged for connection to the baseplate. Horizontal anchoring of the baseplate to the foundation can also be envisaged. Horizontal anchoring can be obtained by means of shear keys. The shear keys can be arranged in order also to control the thermal expansion of the baseplate. In sonic embodiments shear keys can be used, which lock the horizontal movement of the baseplate in one direction, and allow a limited horizontal movement, e.g. due to thermal expansion, in a second direction, orthogonal to the first direction. In some embodiments, a first set of shear keys can be aligned along a longitudinal direction, i.e. a direction parallel to the longer sides of the rectangular baseplate, parallel to the rotation axis of the rotary machines installed on the baseplate. The first set of shear keys can be placed in an intermediate location, near the centerline of the baseplate, i.e. under the area where the rotary machines are located. A second set of shear keys can be provided, aligned according to a transverse direction, i.e. according to a direction orthogonal to the rotation axis of the gas turbine and the load and parallel to the shorter sides of the rectangular baseplate. In some embodiments, the longitudinal alignment and the transverse alignment of said first second sets of shear keys cross in a center area of the baseplate, located approximately under the gas turbine.

According to a further aspect, the present disclosure also relates to a method of assembling an on-shore gas turbine plant, comprising a heavy duty gas turbine, for instance having a rated power of not less than 80 MW, driving a load, in particular for instance an electric generator, comprising the steps of: providing a first foundation on an erection and testing yard; manufacturing a baseplate; anchoring said baseplate to said first foundation, said first foundation forming a baseplate rest surface with anchoring areas arranged according to a first pattern, for anchoring said baseplate to said foundation; assembling on said baseplate said gas turbine, said load, auxiliary facilities and a structure surrounding said gas turbine, said load and said auxiliary facilities, forming a module said structure also includes a gas turbine package; testing the gas turbine and the load; removing the module from the first foundation; transporting the module to a final destination; anchoring the module on a second foundation, said second foundation forming a baseplate rest surface with second anchoring areas arranged according to a second pattern, for anchoring said baseplate to said foundation, said first pattern at least partly corresponding to said second pattern. Testing of the gas turbine plant can be at full speed and no load, or full speed and full load, for example.

After transportation to final destination and anchoring the module on the second foundation, the rotary machines, i.e. the gas turbine and the load, can be adjusted so that the rotary axes thereof are substantially coaxial, i.e. the mutual inclination thereof is within an allowable interval of tolerance. The inclination adjustment of one, the other or both said gas turbine and said load can occur, if required, by means of the above mentioned spherical washers or other inclination adjustment members. Possible deformations of the baseplate which occurred during removal from the first foundation at the erection and testing yard, during transportation, or during anchoring to the second foundation, at the final destination, can thus be taken into account and offset.

Modularization of the heavy duty gas turbine plant shortens the tune required for installation and start-up of the plant. The heavy duty gas turbine and the load powered by the gas turbine, as well as the auxiliary facilities, such as the startup motor, the lubrication systems, the entire wiring; and electric facilities, sensors and probes, the control unit, the fuel system, the cooling devices, and other facilities the module is provided with, can be entirely tested at the erection and testing yard. The module will then require only minor adjustments at the final destination before start-up can take place.

The modularization of the heavy duty gas turbine, relevant load and facilities thus allows substantial savings in terms of time and manpower to be obtained.

The above brief description sets forth features of various embodiments of the present invention in order that the detailed description that follows may be better understood and in order that the present contributions to the art may be better appreciated. There are, of course, other features of embodiments of the invention that will be described hereinafter and which will be set forth in the appended claims. In this respect, before explaining several embodiments the invention in details, it is understood that the, various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

The following detailed description of the exemplary embodiments refers to the accompanying drawings. The same reference numbers in different drawings identify the same or-similar elements. Additionally the drawings are not necessarily drawn to scale. Also, the following detailed description does not limit the invention. Instead, the scope of the invention is defined by the appended claims.

Reference throughout the specification to "one embodiment" or an "embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
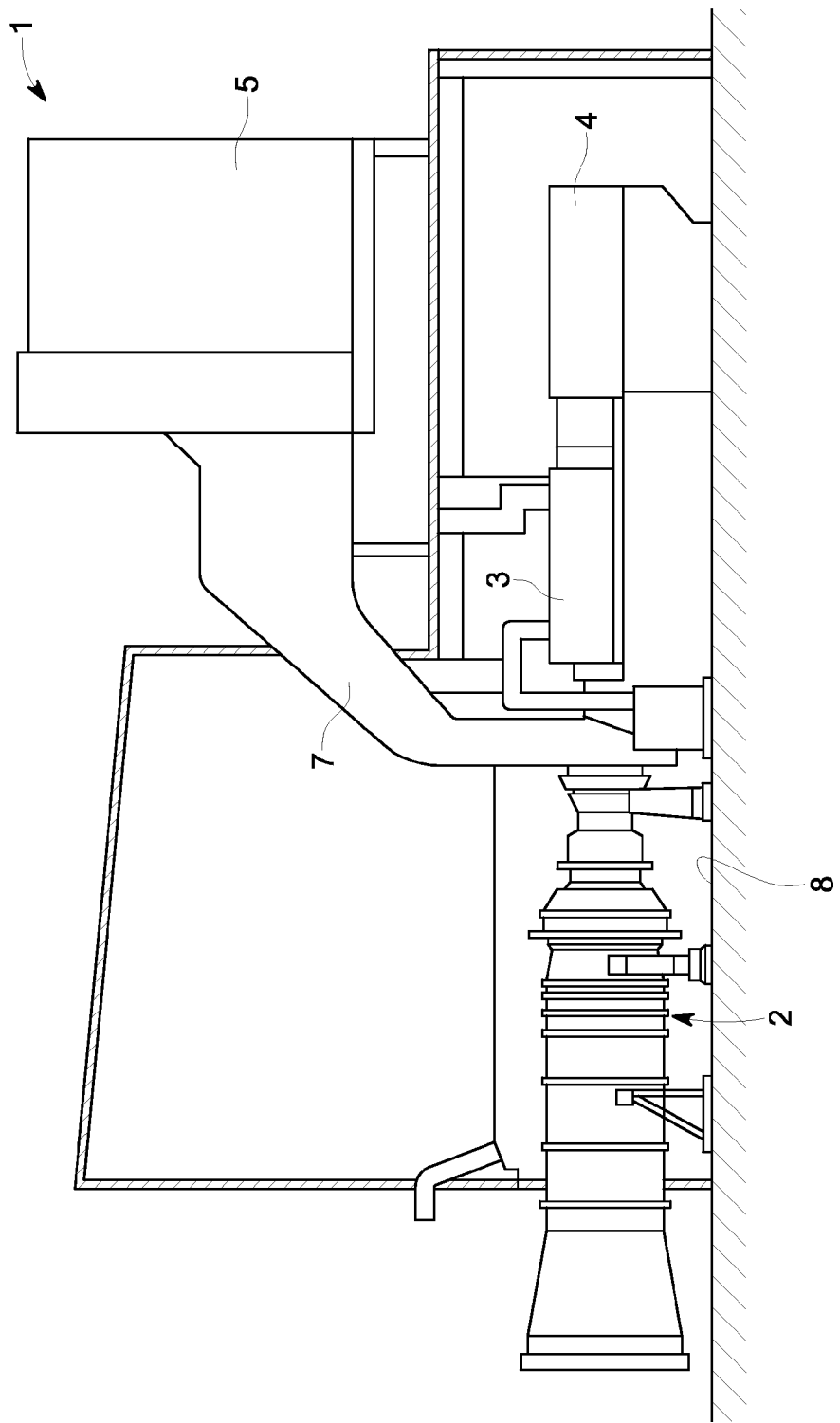
FIG. 1 illustrates a schematic side view of a gas turbine generator plant according to the prior art.
Figure 2:
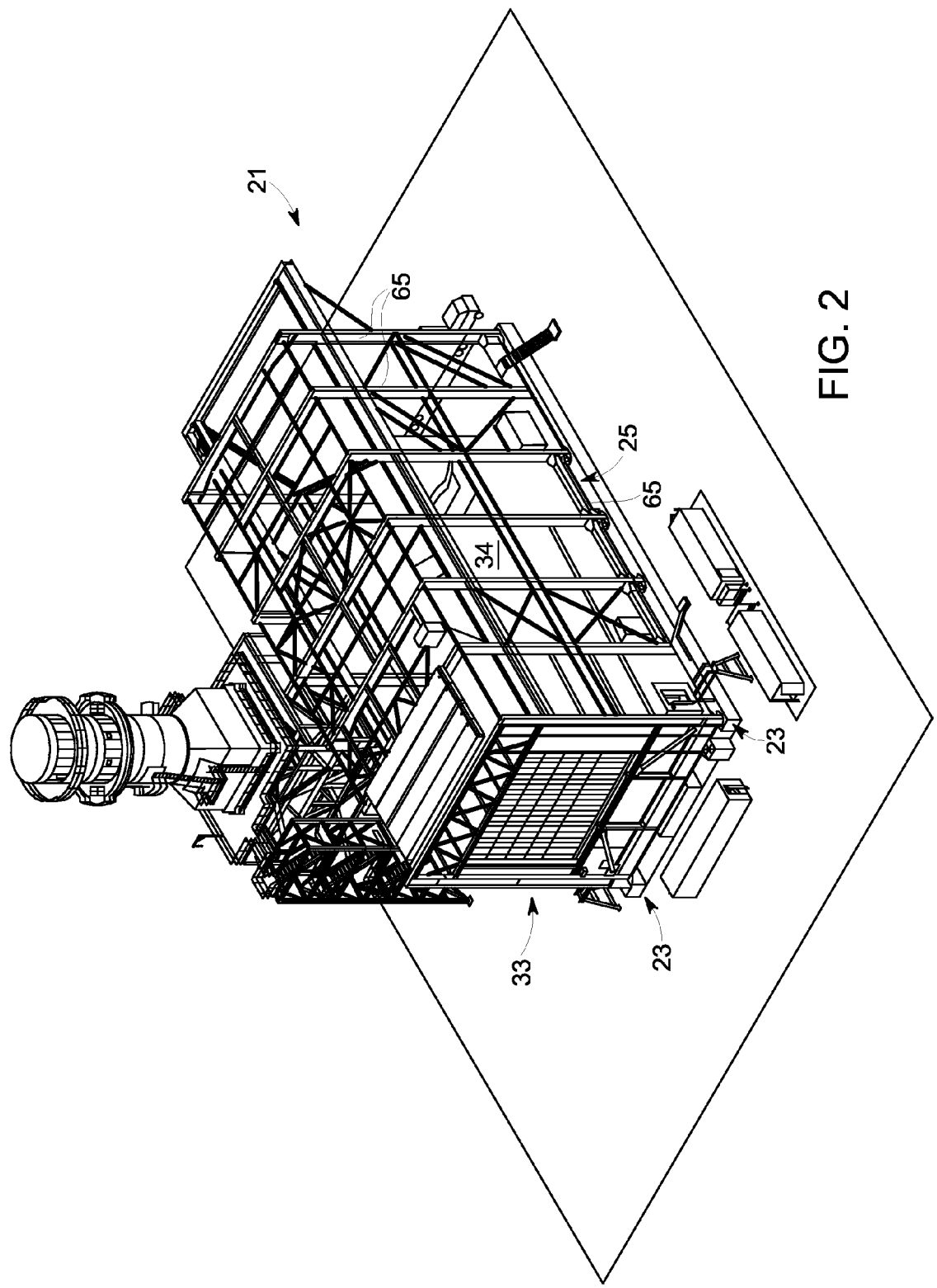
FIG. 2 illustrates an axonometric view of a modular gas turbine generator arrangement according to an embodiment of the present invention.
Figure 3:
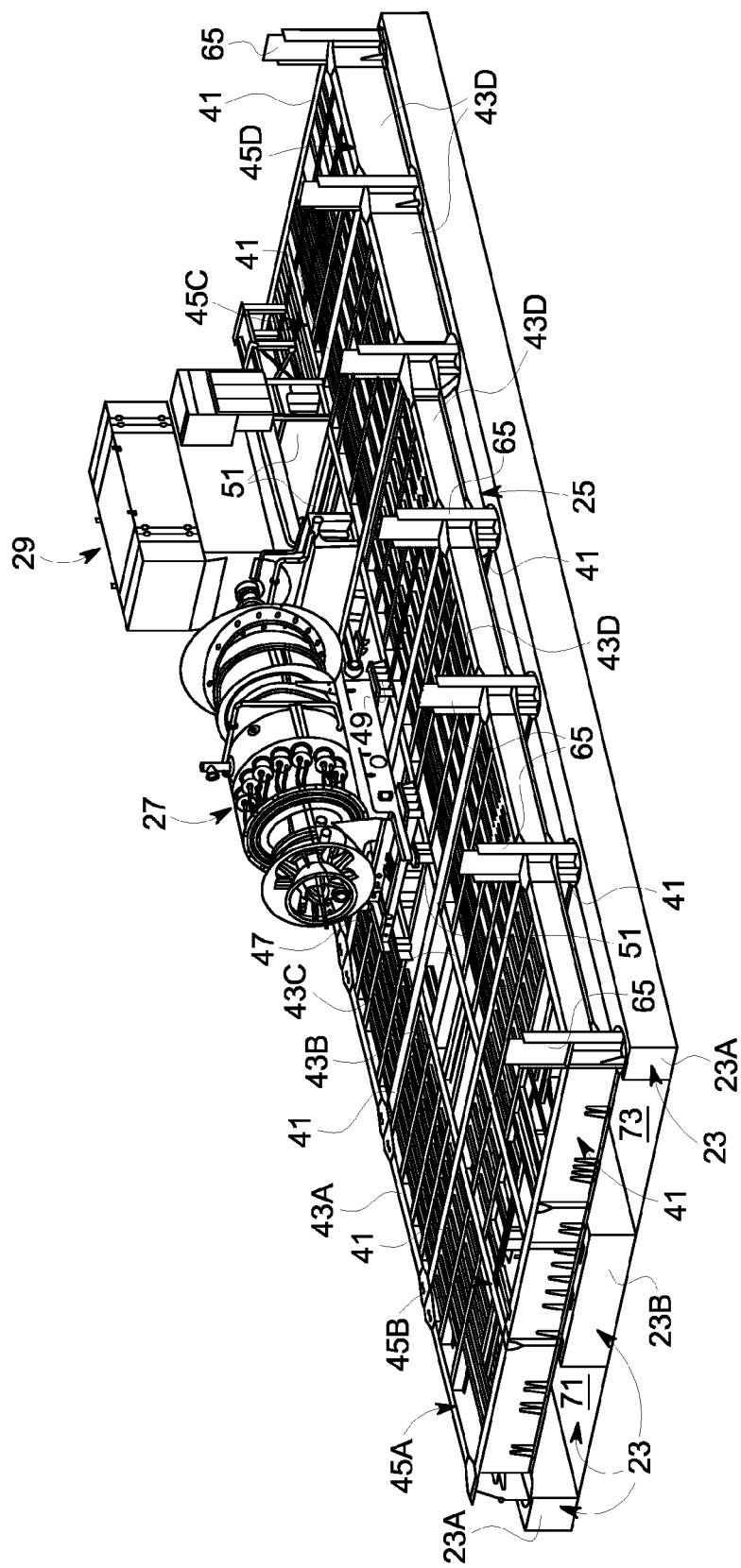
FIG. 3 illustrates an axonometric view of the baseplate of the module of FIG. 2 with a gas turbine and an electric generator mounted thereon.
Figure 4:
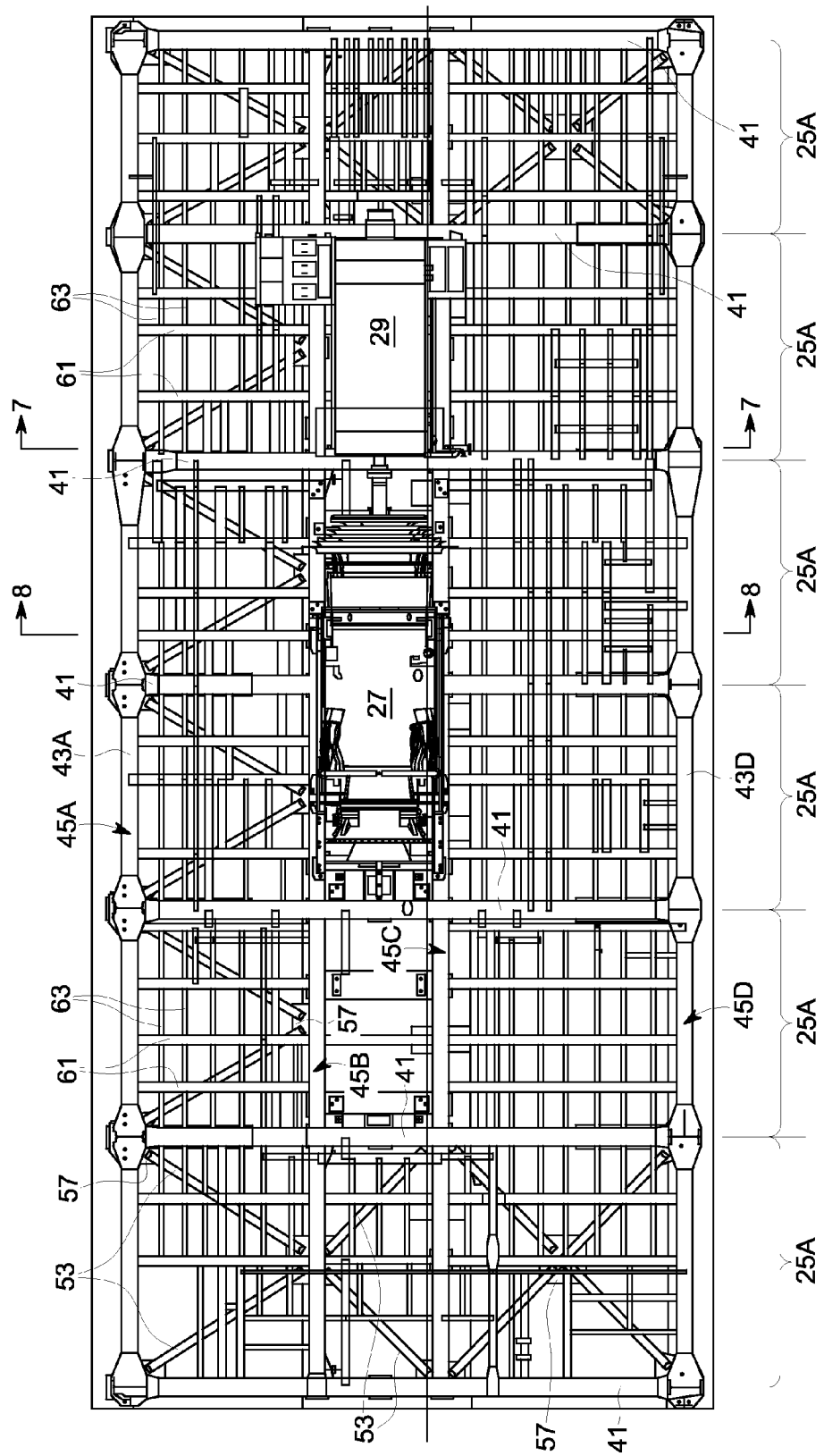
FIG. 4 illustrates a top plan view of the baseplate of FIG. 3.

FIG. 2 illustrates an axonometric view of a gas turbine generator plant according to one embodiment of the present disclosure, FIG. 3 illustrates an axonometric view and FIG. 4 illustrates a top plan view of the baseplate and the main rotary machines arranged thereon. The gas turbine generator plant is designed as a module, labeled 21 in FIGS. 2 and 3 and is placed on foundations 23. The plant comprises a baseplate 25 supporting a gas turbine 27, an electric generator 29 and auxiliary units, such as the gas turbine starter (not shown), connected to the gas turbine on the side opposite the electric generator 29.

The baseplate 25 also supports a surrounding structure 33 within which auxiliary devices, apparatus and facilities are arranged, such as cranes for moving the machines forming the gas turbine train, air inlet unit, filters, silencers, fuel delivery and control systems, lubrication systems and the like. These facilities are known to those skilled in the art and will not be described in greater detail. A gas turbine package 34 is also housed in the structure 33.

The baseplate 25 is designed so that it can be fabricated in a production yard, shipped to the erection and testing site, where it is completely assembled with the entire machinery, auxiliary equipment and surrounding structure 33. This results in the entire plant being completely modularized. After assembling and testing, the module can be shipped to final destination and simply anchored to the foundation provided in the final destination, thus minimizing human intervention and time needed to start the plant.

In some embodiments the gas turbine 27 is a heavy duty gas turbine producing 80 WW or more, e.g. having a rated power of between 80 MW and 150 MW. An example of a suitable heavy duty gas turbine 27 is the MS9001E gas turbine available from GEEPE (Belfort-France). Another suitable heavy duty gas turbine is MS7001EA, specifically developed from GE Energy US for the 60 Hz energy market. These heavy duty gas turbines are designed to delivery mechanical power in the range of 80-140 MW. The structure of the baseplate 25 is specifically designed to allow the heavy rotary machines (gas turbine 27 and electric generator 29) as well as the surrounding structure and the remaining facilities to be assembled thereon, tested and shipped without the need for disassembling parts thereof upon testing and for transportation purposes. The main features of the baseplate 25 will be described here below, reference being made specifically to FIGS. 2 to 8.

As shown in FIG. 2, in some embodiments the combustion gases exhaustion arrangement is placed sideways of the main module 21. This reduces the overall dimensions of the module 21 and the footprint thereof, i.e. the dimensions of the baseplate 25.

According to some exemplary embodiments, the baseplate, 25 has a complex lattice structure, comprising a primary lattice structure and a secondary lattice structures. For the sake of a better understanding of the main features of the modularized gas turbine generator plant, the principal components of the primary lattice structure are shown in isolation in FIG. 5, where the elements of the secondary lattice structure are removed. The entire baseplate structure is illustrated in FIGS. 3, 4 and 6, the latter being an axonometric view from the bottom of the baseplate.

In some embodiments the primary lattice structure of the baseplate 25 is comprised of a plurality of baseplate sections 25A, 25B, 25C, 25D, 25E, 25F assembled together along a longitudinal extension of the baseplate 25. The longitudinal extension is parallel to the rotation axis of the co-axial rotary machines arranged on the baseplate 25, i.e. the gas turbine 27 and the electric generator 29. Each section 25A, 25B, 25C, 25D, 25E, 25F comprises two transverse beams 41 extending, inn the transverse direction, i.e. substantially orthogonal to the gas turbine and electric generator axis, across the entire width of the baseplate 25. Between each pair of transverse beams 41, a plurality of longitudinal beam portions 43 are provided. In the exemplary embodiment illustrated in the drawings, four longitudinal beam portions 43 are arranged between each pair of transverse beams 41. These four longitudinal beam portions are labeled 43A, 43B, 43C and 43D. By assembling and welding together the various baseplate sections 25A, 25B, 25C, 25D, 25E, 25F a primary lattice structure of the baseplate 25 is obtained, comprised of four longitudinal beams extending from a first end to a second end of the baseplate. The resulting longitudinal beams are labeled 45A, 45B, 45C and 45D, respectively.

In some embodiments the transverse beams 41 and the beam portions 43 are H-shaped or I-shaped beams. Due to the large dimension thereof, the beam portions 43 and the beams 41 are not manufactured by hot rolling, but rather formed by a central web welded to two opposing flanges.

The intermediate beam portions 43B and 43C, and the transverse beams 41 have identical vertical dimensions, thus defining a top planar surface and a bottom planar surface. In some embodiments, the longitudinal beam portions 43A and 43D of some baseplate sections 25A, 25B, 25C, 25D, 25E, 25F have a smaller vertical dimension, as can be best appreciated in FIG. 3. More specifically, in the exemplary embodiment illustrated in the drawings, the baseplate 25 is comprised of six sections 25A, 25B, 25C, 25D, 25E, 25F and the first four sections 25A, 25B, 25C, 25D have smaller longitudinal beam portions 43A, 43D. In other embodiments, not shown, all the lateral beam portions 43A, 43D of all the baseplate sections 25A-25F can have a reduced vertical dimension. The lateral longitudinal beam portions 43A, 43D are arranged such that the top flanges thereof are on the common top planar surface.

As can be appreciated for instance from the top plan view of the baseplate 25 and relevant rotary machines arranged thereon, the two intermediate longitudinal beams 45B, 45C are placed near to one another at a distance such that the rotary machines can be supported on said longitudinal beams 45B, 45C.

More specifically, the gas turbine 27 is supported on a gas turbine frame or gas turbine baseplate 47 which is in turn mounted on the two intermediate longitudinal beams 45B, 45C with the interposition of feet 49. Connection between the feet 49 and the gas turbine baseplate 47 on the one side and the baseplate 25 on the other can be by welding. With this arrangement, the weight of the gas turbine is directly supported by the intermediate longitudinal beams 45B, 45C. In some arrangements, auxiliary transverse reinforcing beams 48 are located under the gas turbine baseplate 47, to provide rigid ground to create transverse and/or longitudinal restraints for the gas turbine baseplate 47 and the module baseplate 25.

In some embodiments, the electric generator 29 is mounted on two transverse box-shaped supports 51. In some embodiments the two box-shaped supports extend across the distance of the two intermediate longitudinal beams 45B, 45C and are anchored thereon, for instance by welding. In the embodiment illustrated in the drawings the distance of the two box-shaped supports in the longitudinal direction, i.e. in the direction parallel to the gas turbine axis, corresponds to the width of the respective baseplate section 25A, 25B, 25C, 25D, 25E, 25F so that the box-shaped supports 51 partly transmit the weight of the electric generator to the transverse beams 41.

In the embodiment illustrated in the drawings, the intermediate longitudinal beams 45B, 45C are not located symmetrically with respect to the centerline of the baseplate 25, but rather nearer to the longitudinal beam 45A than to the, longitudinal beam 45D. In other embodiments, the arrangement of the longitudinal beams 45A-45D can be symmetrical with respect to the centerline of the baseplate 25.

Uprights 65 of the structure 33 surrounding the machinery are welded to the baseplate 25 at the nodes where the longitudinal beam portions 43A-43B and the transverse beams 41 are connected to each other along the longitudinal side edges of the baseplate 25. The layout of the structure 33 will not be described in detail. The design of the structure 33 can differ depending upon the kind of facilities housed in the structure and the arrangement thereof.

Figure 5:
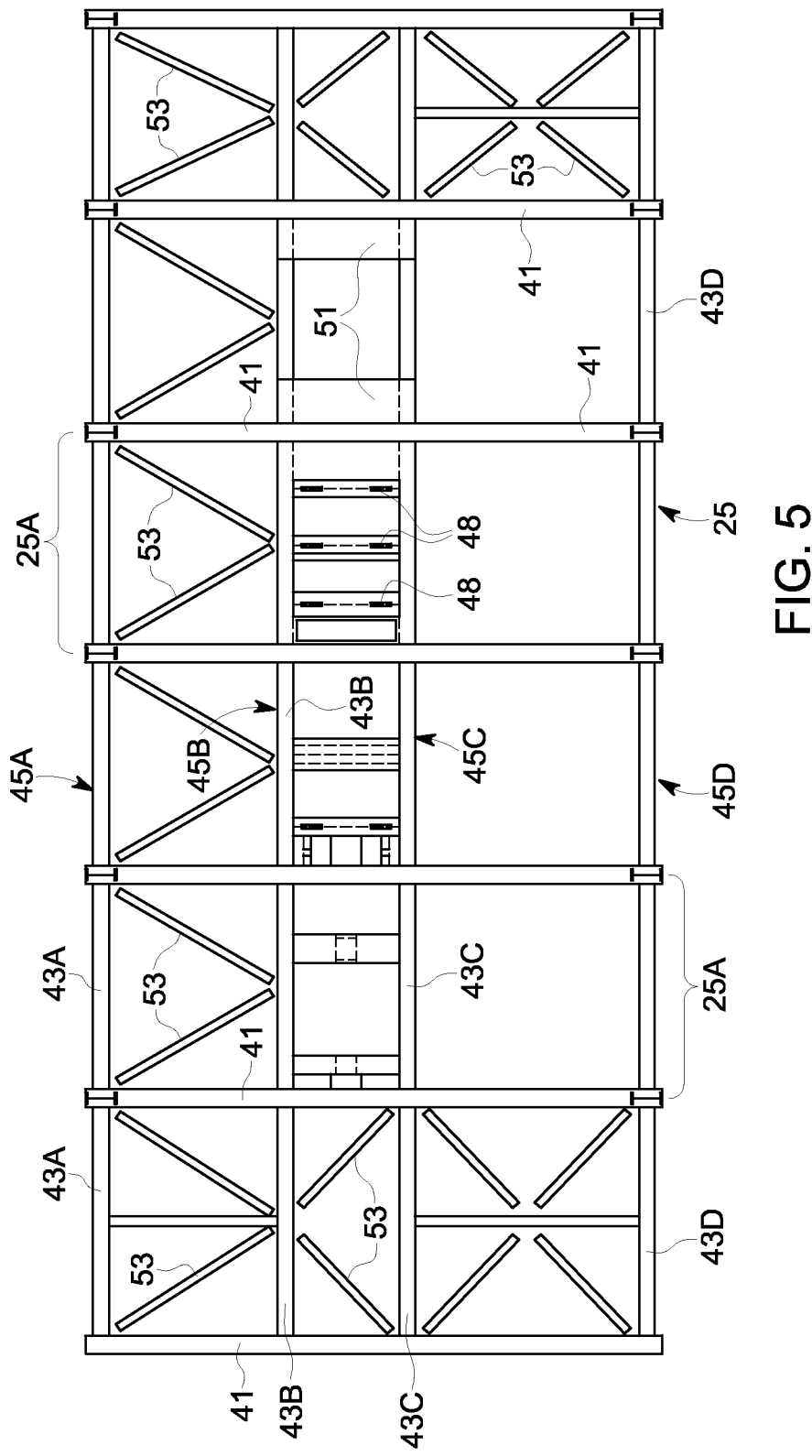
FIG. 5 illustrates a simplified top plan view of the main components of the baseplate according to an embodiment of the present invention.
Figure 6:
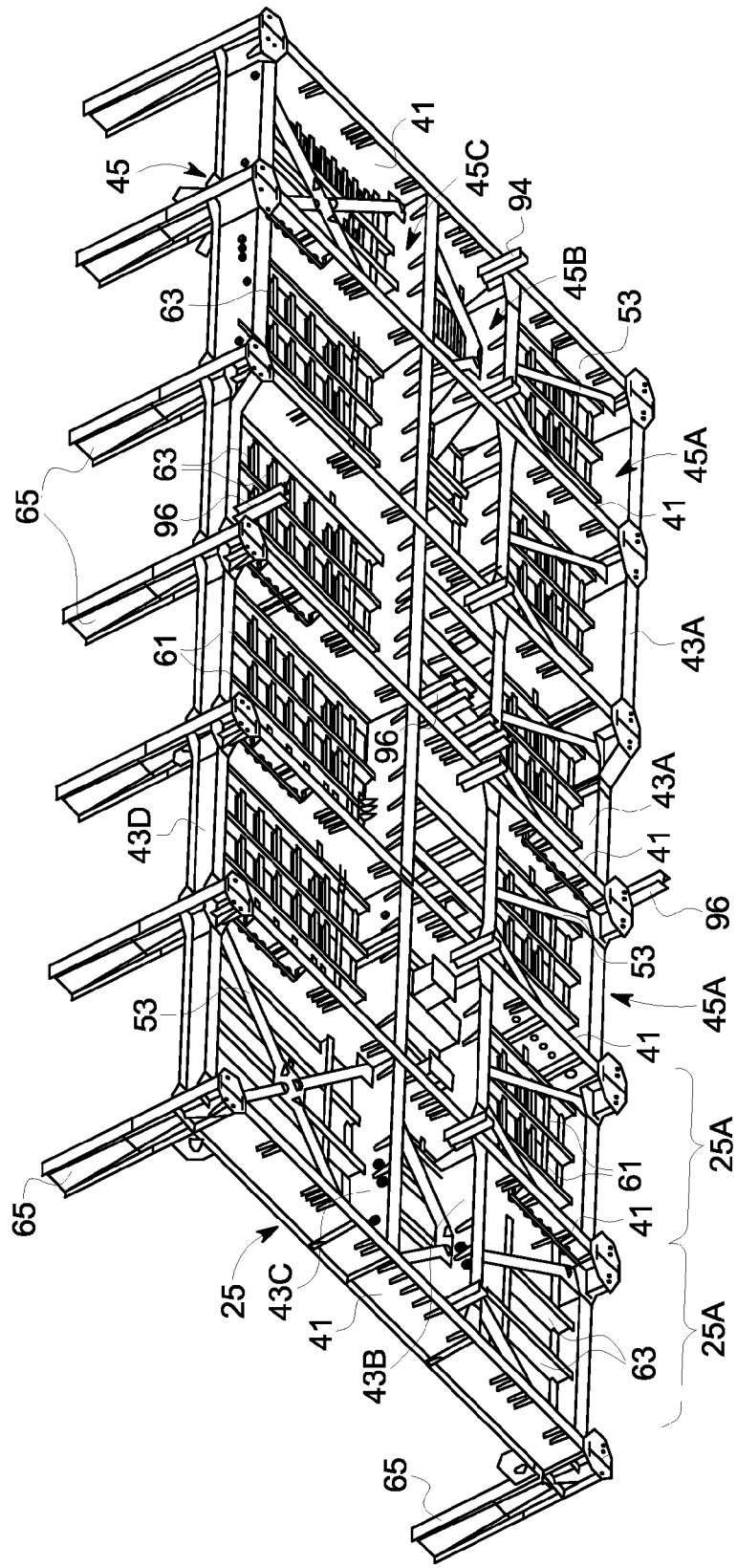
FIG. 6 illustrates a bottom axonometric view of the baseplate according to an embodiment of the present invention.

As can be appreciated from FIG. 5, some of the rectangular meshes of the primary lattice structure formed by the longitudinal beams 45A-45D and the transverse beams are provided with bracings 53, 55 welded to one another and/or to the primary lattice structure formed by beams 41 and 45A-45D by auxiliary reinforcing plates 57, shown in FIG. 4, but omitted in the simplified top plan view of FIG. 5. The bracings 53, 55 stiffen the entire baseplate 25 in the horizontal plane. In some embodiments the inclined bracings 53, 55 are provided in each rectangular mesh of the primary lattice structure formed by the transverse beams 41 and the longitudinal beams 45 along one of the longer sides of the baseplate 25 and both shorter sides thereof. In the embodiment disclosed in the drawings the bracings are arranged the rectangular meshes of the primary lattice structure between one of the intermediate longitudinal beams supporting the rotary machines 27, 29 and the adjacent side longitudinal beam, i.e. the external longitudinal beam 45A.

In each mesh formed by the primary lattice structure, secondary beams are arranged, forming a secondary lattice structure. The secondary beams are labeled 61, 63, the secondary beams 61 extending parallel to the beams 41 and the secondary beams 63 extending parallel to the longitudinal beams 45A-45D. The secondary beams 61, 63 and the secondary lattice structure formed thereby will not be described in detail. The arrangement thereof can vary depending on the layout of the various facilities arranged in the structure 33. The secondary lattice structure formed by the secondary beams 61, 63 defines a resting structure for floor panels of the auxiliary equipment.

The transverse beams 41 and at least the central longitudinal beams 45B, 45C form a bottom planar surface resting on the foundation 23. The foundation is usually formed as an underground block of cast reinforced concrete with some aboveground extensions, As can best be seen in FIGS. 3, 7 and 8, the foundation 23 forms a horizontal planar surface F on which the baseplate 25 is placed. The horizontal planar surface F is discontinuous. More specifically, the planar surface F is interrupted by two empty spaces, here below referred to as "channels" longitudinal 71, 73. The longitudinal channel 71 has a bottom surface 71B and side surfaces 71S. The longitudinal channel 73 has a bottom surface 73B and side surfaces 73S. The two channels 71 and 73 divide the block of reinforced concrete forming the foundation 23 in two side walls or side plinths 23A and one central wall or central plinth 23B, forming said aboveground extensions of the underground block of cast reinforced concrete. The side walls or extensions 23A of the underground block can be replaced or formed by two plinth rows.

The lower flange of each transverse beam 41 rests on the top surfaces of the walls 23A, 23B, thus forming three zones where each transverse beam 41 rests on the foundation 23. The lower flanges of the two intermediate longitudinal beams 45B and 45C contact the top surface of the intermediate wall 23B along the longitudinal extension of the baseplate 25, at least in the area where the gas turbine 27 and/or the electric generator 29 are arranged. As will be described later on, the module is not directly in contact with the foundation, but rather supported thereon by means of sole plates and stud bolts grouted to the reinforced concrete structure of the foundation 23.

Figure 7:
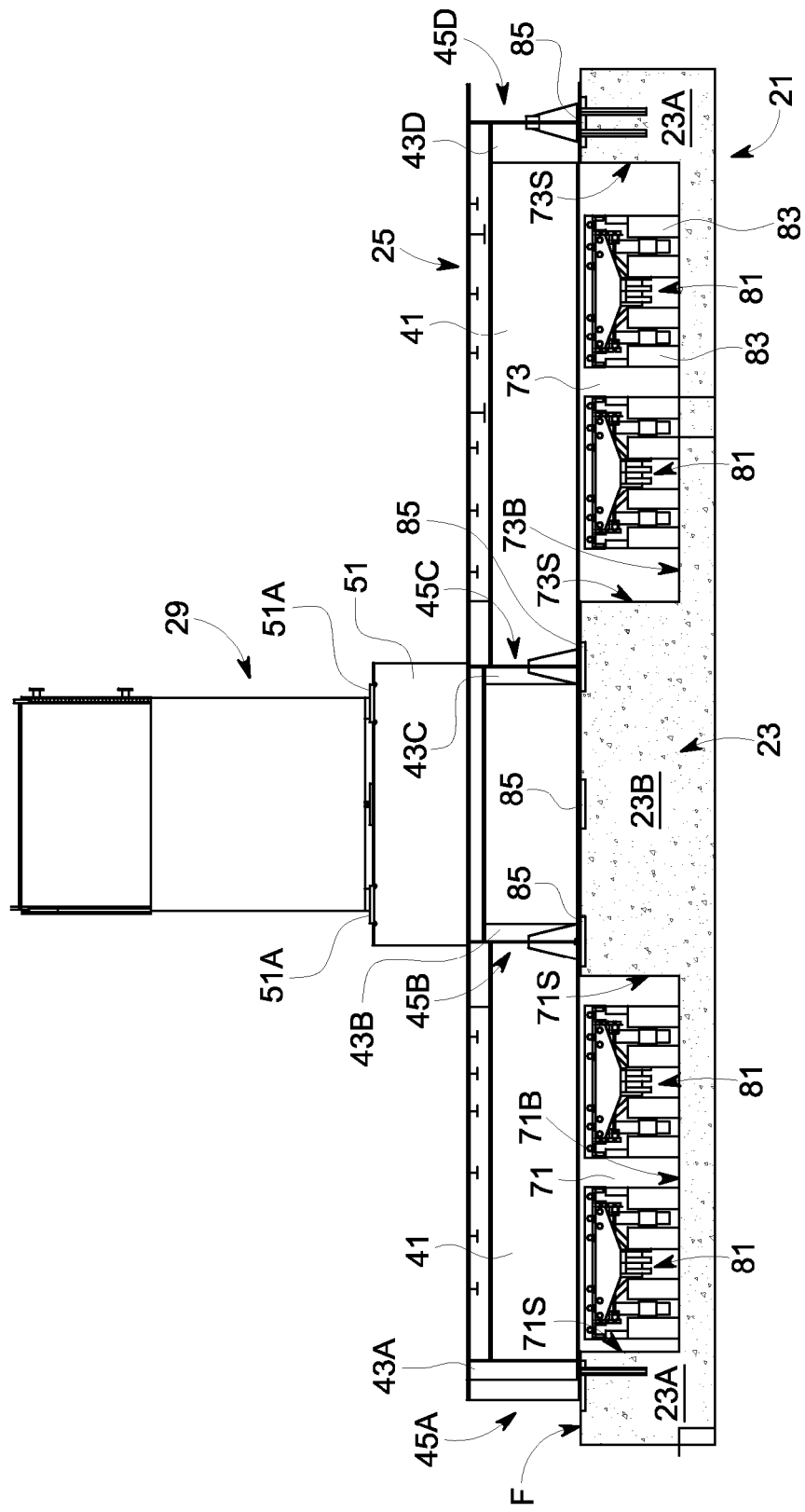
FIG. 7 illustrates a cross sectional view according to line VII-VII of FIG. 4.
Figure 8:
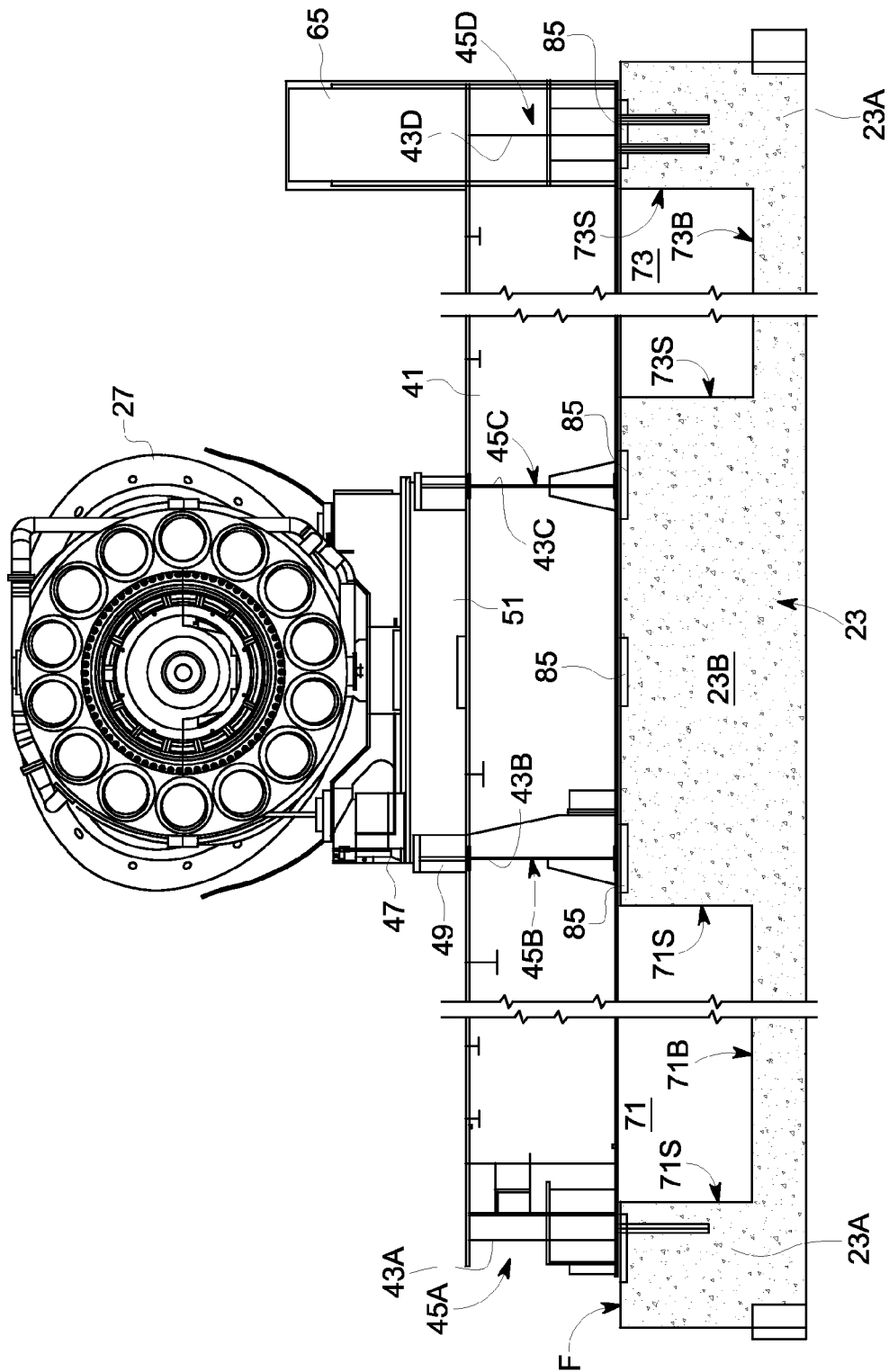
FIG. 8 illustrates a cross sectional view according to line VIII-VIII of FIG. 4.

As shown in particular in FIGS. 7 and 8 the "channels" 71, 73 are used for introducing lifting and moving trailers 81 under the baseplate 25 of the module 21. The trailers are provided with respective wheels 83 and vertically movable lifting plates, operated e.g. hydraulic or mechanical jacks, not shown. As already mentioned, the structure of the baseplate 25 and of the module 21 are such that the entire gas turbine generator plant can be assembled and tested in an erection and testing yard before being shipped at the final destination. Substantially similar foundations 23 will be provided both at the erection and testing yard and at the final destination of the modularized gas turbine generator plant, The complete Module can thus be assembled at the erection and testing yard or site With the baseplate 25 properly anchored to the foundation 23, and the plant can be tested, e.g. in full-speed, no-load conditions, in a configuration that expresses and represents in the best achievable way both the static and the dynamic "in-service" behavior. Each piece of machinery can be properly adjusted and tuned. Once the tests have been completed, the baseplate 25 will simply be detached from the foundation 23, and lifted along with the machinery, facilities and structure 33 mounted thereon, and transported by means of the trailers 81, e.g. on a ship for transportation to the final destination.

On the ship the module will be laid on temporary foundations having a configuration once again similar to those provided at the final destination one, driven by the fact that the same kind of trailers will be used both at the erection and testing yard and at the final destination.

Here the same trailers 81 used at the erection and testing yard, or similar trailers provided at the final destination, will be used to lift the module and transport it from the ship onto the foundation 23, Since the foundations in the two sites (erection and testing yard and final destination) are substantially identical, the module will be ready for start-up just after minor reinstatements and checks.

The above described structure of the baseplate 25 and the structure of the foundation 23, with the "channels" 71, 73 are specifically designed to support the entire module including a heavy duty gas turbine and relevant electric generator, allowing transportation of the module with only negligible flexural deformations of the baseplate, so that the plant will be substantially ready for startup once it will be relocated in the final destination and properly anchored to the foundation 23.

A particularly efficient anchoring arrangement has been developed for this purpose and will be described here below, reference be made to FIGS. 9 to 12.

In the upper surfaces of the three walls 23A, 23B a plurality of recesses are provided, wherein sole plates are located, forming bearing surfaces for the baseplate 25. The recesses are distributed according to the lattice structure of the baseplate 25. For example, the recesses can be located along the longitudinal beams 45A-45D and in some embodiments along the intermediate longitudinal beams 45B, 46C, as well as along the transverse beams 41, and in some embodiments, at the nodes Where the beams cross each other. In some arranged under the turbine 27.

Figure 9:
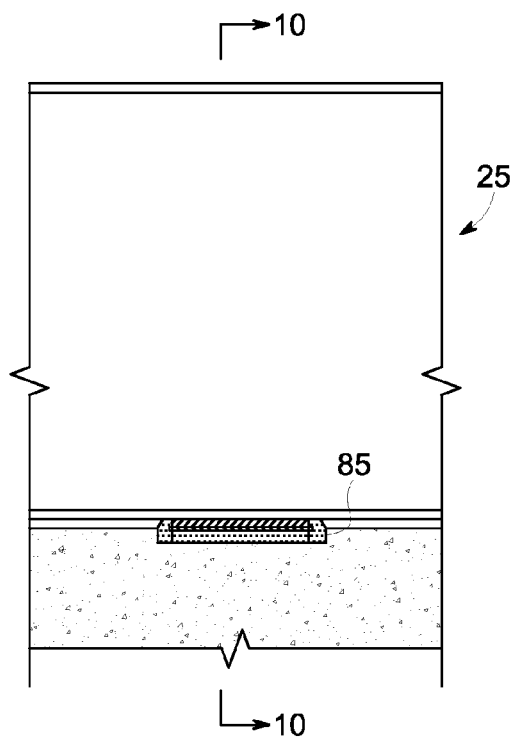
FIG. 9 illustrates a detail of a sole and sub-sole arrangement on which the baseplate rests on the foundation according to an embodiment of the present invention.
Figure 10:
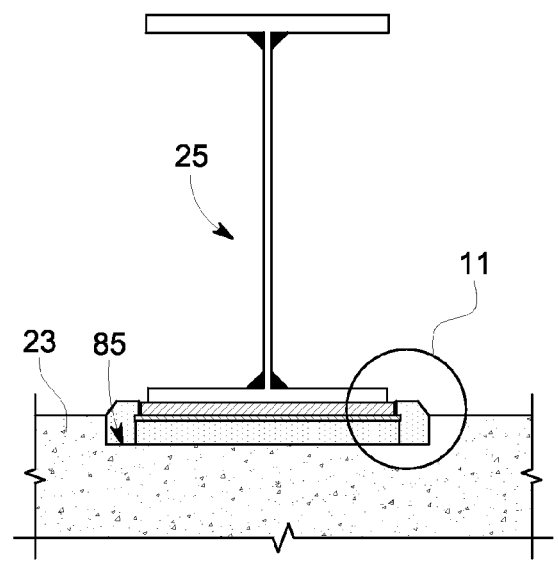
FIG. 10 illustrates a cross sectional view according to line X-X of FIG. 9.
Figure 11:
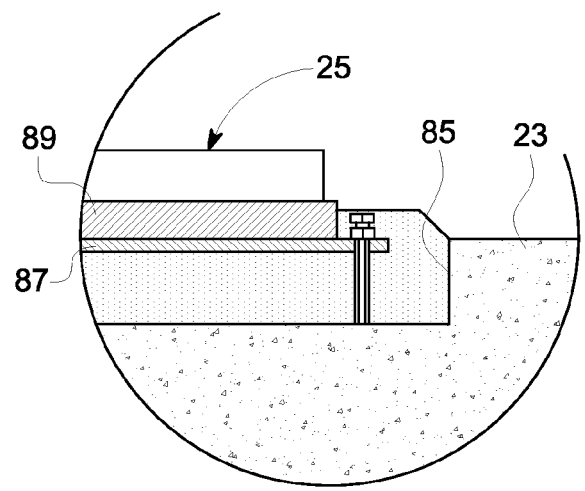
FIG. 11 illustrates an enlargement of the detail indicated with XI in FIG. 10.

An exemplary recess and relevant sole plate arrangement is shown in FIGS. 9 to 11. In the recess, labeled 85, a sub-sole plate 87 and a sole plate 89 are arranged and grouted. The sub-sole plate 87 is provided with leveling screws 91, Before placing the module 21 on the foundation 23, sub-sole plates 87 and the corresponding sole plates 89 are positioned in each recess 85 and leveled so that the upper surface of the sole plate is horizontal. The sole plate and sub-sole plate arrangement 87, 89 is thereafter grouted in the recess 85 so that it is retained in the correct position. The module 21 is then transferred by means of the trailers 81 above the foundation 23 and lowered to rest on the sole plates 89. Possible gaps between the baseplate 25 and individual sole plates, due to baseplate 25 construction tolerances, are filled with shims (not shown).

Near each sole plate 87, stud bolts 93 are grouted in holes 95 formed in the reinforced concrete block of the foundation 23. The baseplate 25 is connected to the stud bolts 93 by means of nuts 97, the stud bolts 93 extending across through holes 98 provided in the baseplate 25, e.g. in the lower flange 99 of the transverse beams 41, or of the longitudinal beams 45A-45D, The stud bolts 93 provide a vertical anchoring of the baseplate 25 to the foundation 23.

Usually, the stud bolts 93 are not designed to withstand horizontal shear stresses and are therefore unsuited to provide a horizontal anchoring of the baseplate 25 to the foundation 23. In the embodiment illustrated in the drawings, shear keys are additionally provided on the bottom of the baseplate 25, to provide a horizontal anchorage of the baseplate 25 to the foundation 23. The structure and arrangement of the shear keys is such as to control the thermal expansions of the baseplate 25. It shall indeed be observed that, due to thermal gradients between the foundation 23 and the baseplate 25, the latter can undergo thermal expansions in both longitudinal and transversal directions, said expansions being different than the corresponding thermal expansions of the foundation 23 to which the baseplate 25 is anchored.

In the bottom view of the baseplate 25 shown in FIG. 6 the general arrangement of the shear keys is shown. In this embodiment, a first set of shear keys 94 are aligned along the longitudinal direction of the baseplate 25, i.e. the direction parallel to the longer sides of the rectangular baseplate 25 and parallel to the rotation axis of the gas turbine 27 and the electric generator 29. In some embodiments, the shear keys 94 of the first set are located between the second longitudinal beam 45B and the third longitudinal beam 45C. In some embodiments, the shear keys 94 are located near to one or the other of the two parallel longitudinal beams 45B, 45C, rather than centrally there between. A second set of shear keys 96 are aligned along a transverse line, parallel to the short sides of the baseplate 25 and therefore oriented at 90° to the rotation axis of the gas turbine 27 and the electric generator 29. In the embodiment shown in FIG. 6, the two alignment directions of the two sets of shear keys cross each other under the gas turbine. In some embodiments, the shear keys are identical to one another. They can either block the movement of the baseplate 25 in both, horizontal directions, or leave a degree of freedom to the baseplate 25 in one horizontal direction, while locking the baseplate 25 in the other, depending upon how the shear keys are connected to the beams forming the baseplate 25.

Figure 16:
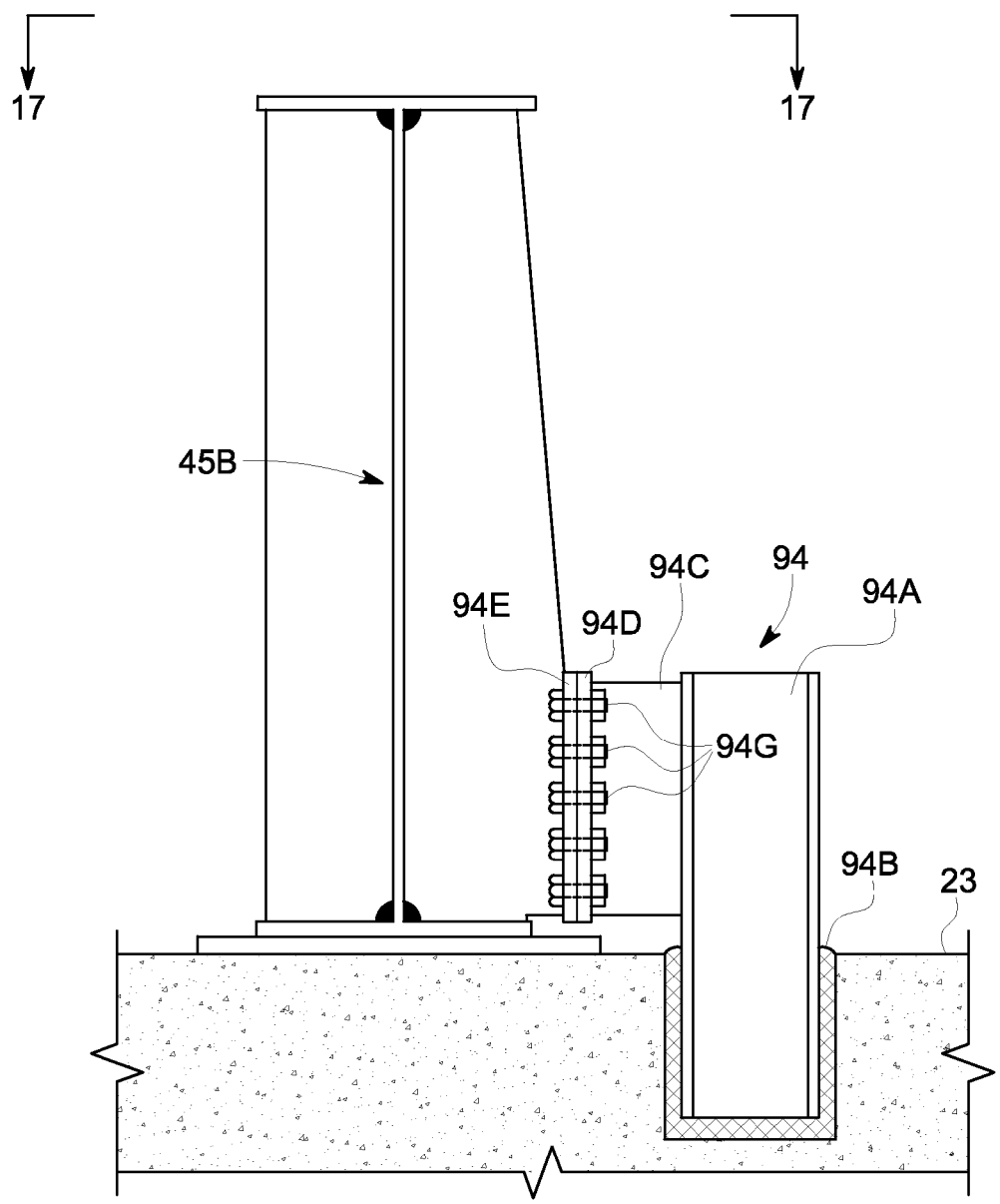
FIG. 16 illustrates a side view of a shear key used to horizontally anchor the baseplate to the foundation according to an embodiment of the present invention.
Figure 17:
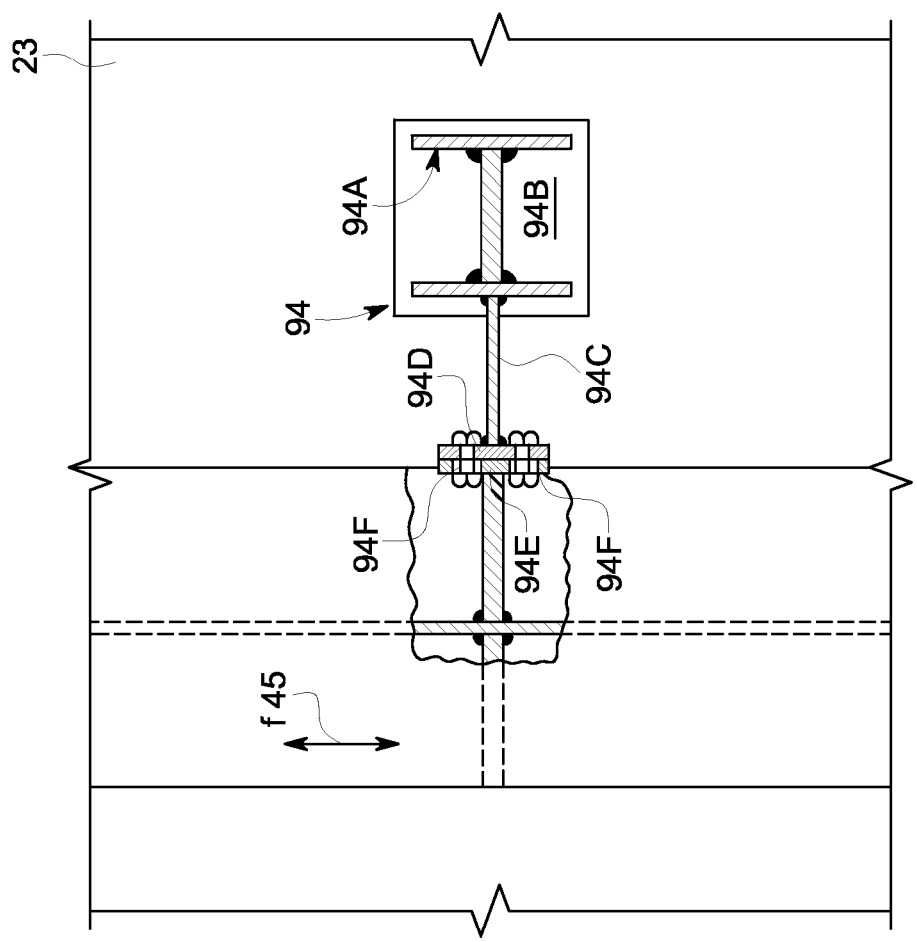
FIG. 17 illustrates a view according to line XVII-XVII of FIG. 16.

The connection between the baseplate 25 and one of the shear keys 94 is illustrated in FIGS. 16 and 17 and will be described here below. The shear keys 96 are connected to the baseplate 25 in substantially the same manner.

In the illustrated embodiment the shear key 94 comprises a vertically arranged I-shaped beam 94A, which is groaned in a seat 94B formed in the foundation 23. The shear key 94 further comprises a connection slab 94C, welded to one of the flanges of the I-shaped beam 94A and to a connection plate 94D. The connection plate 94D is fixed to an anchoring flange 94E, which is in turn welded to one of the beams forming the primary lattice structure of the baseplate 25, e.g. the beam 45B. Screw-and-nut arrangements 94G lock the connection plate 94D and the anchoring flange 94E together. To allow a horizontal movement, e.g. due to thermal expansion, of the beam 45B with respect to the beam 94A grouted in the foundation 23, the anchoring flange 94D can be provided with slots elongated in a direction parallel to the beam 45B, through which the screws 94D pass. With this arrangement, a displacement according to arrow f45 of the beam 45B with respect to the shear key 94 is possible.

The arrangement is such that the shear keys 94 allow a controlled displacement of the baseplate 25 parallel to the alignment of said shear keys 94, i.e. parallel to the rotation axis of the turbine 27 and of the electric generator 29. Conversely, the shear keys 96 allow a controlled displacement of the baseplate 25 parallel to the cross direction, i.e. the direction oriented at 90° with respect to the rotation axis of the gas turbine 27 and electric generator 29. The area of the baseplate 25 where the two sets of shear keys cross each other, i.e. the area under the gas turbine 27, is substantially locked to the foundation 23.

The module is therefore able to expand thermally in both the longitudinal direction and in the cross direction with respect to the foundation 23, maintaining the center of the baseplate 25 substantially fixed.

In order to avoid flexural stresses on the stud bolts 93 due to the thermal expansion and consequent horizontal displacement of the baseplate 25, the through holes 98 through which the stud bolts 93 extend are substantially larger than the stud bolts and/or are slotted.

In some embodiments, the welded steel structure of the baseplate 25, also due to the dimensions thereof, has construction tolerances that do not allow reaching the desired level of planarity of the rotary machines bearing surfaces. For this reason, these surfaces can be machined once the baseplate 25 is positioned on the foundation at erection and testing yard.

The alignment of the shafts of the rotary machines forming the rotary machine train must be in fact accomplished prior to initial starting, both for testing and for operations, after the module has been installed on the foundation. Improper alignment may cause vibrations and, at worst, premature bearing failure. Cold alignment compensates for the thermal growth of operating equipment by correctly offsetting the driving and driven equipment. The offset allows the equipment to grow into alignment at normal operating conditions.

Ideal full load (hot) alignment occurs when all drive tram member centerlines, i.e. the rotary axes of the various rotary machines (gas turbine, electric generator, starter) exactly coincide. It is intended to position the cold centerline of each drive train member such that at full load temperature, each member of the drive train will move to the ideal position.

In addition to the above, although the structure of the baseplate 25 is particularly stiff, the weight of the rotary machines arranged thereon and the possible environmental loads encountered are such that, during transportation of the module 21 from the manufacturing site, or erection and testing yard, to the final destination, some deformations of the baseplate 25 could occur or, most probably, some even though small changes in the relative position of the driving to driven equipment can happen, so that the rotary machines must be re-aligned after installation at final destination.

Figure 13:
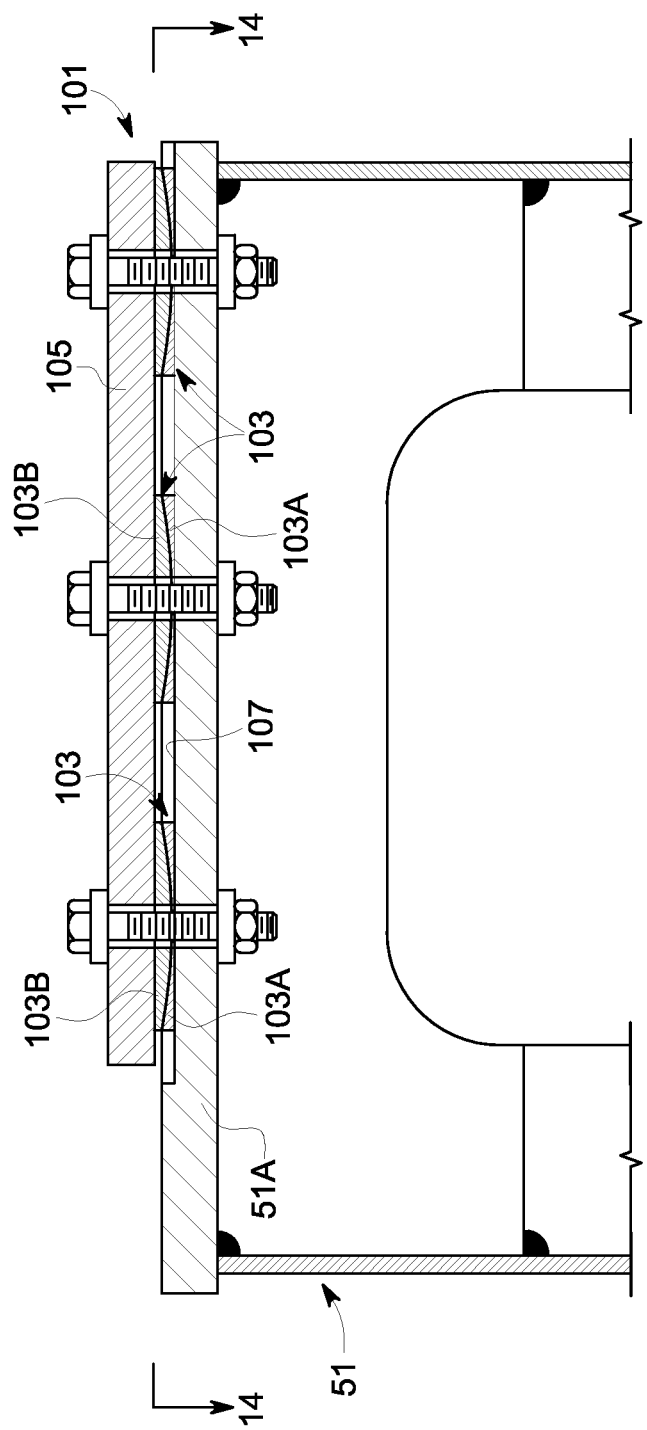
FIG. 13 illustrates a cross sectional view according to a vertical plane, parallel to the turbine axis, of a spherical washer arrangement supporting the electric generator according to an embodiment of the present invention.
Figure 14:
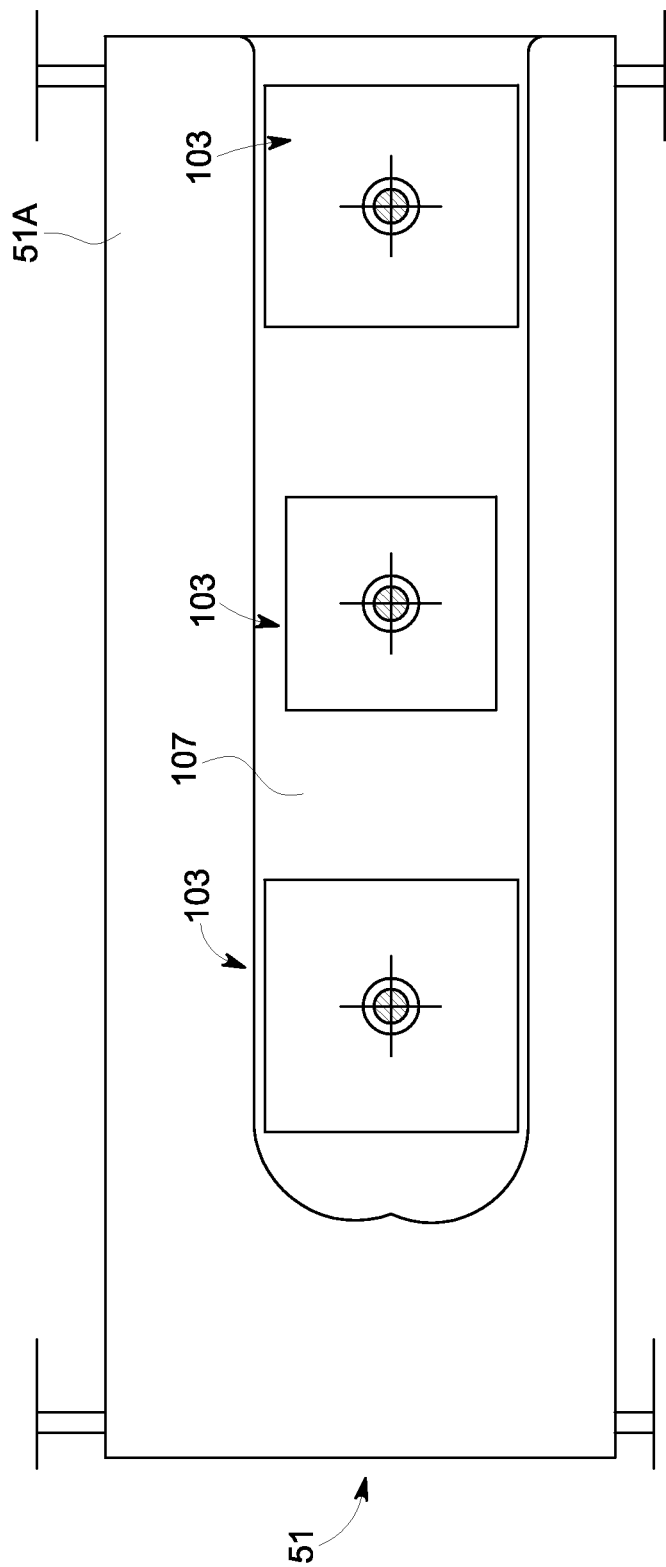
FIG. 14 illustrates a view according to line XIV-XIV of FIG. 13.

For this purpose, according to some embodiments, at least one of the rotary machines, and in some embodiments both the gas turbine and the electric generator are mounted on the baseplate 25 with the interposition of spherical washers. FIGS. 13 and 14 show the spherical washer arrangement placed under the electric generator 29. In some embodiments the casing of the electric generator is mounted on the two box-shaped supports 51 with the interposition of four sets of spherical washers arranged at the ends of both said box-shaped supports 51. Each set 101 of spherical washers comprises for instance three spherical washers 103. The spherical washers are interposed between a lower plate 51A, for instance forming an integral part of the relevant box-shaped support 51, and an upper generator-supporting plate 105. In some embodiments the lower plate 51A has a shallow channel 107 machined on the upper surface thereof. The three spherical washers 103 of each set are placed in the shallow channel 107 and partly project therefrom. Each spherical washer 103 may be round or square or rectangular in a plan view and is comprised of two components 103A and 103B. The component 103A is in contact with the bottom of the shallow channel 107, while the component 103B is in contact with the upper generator-supporting plate 105.

The two components 103A, 103B are provided with respective concave and convex spherical surfaces contacting each other. The inclination of each upper component 103B with respect to the box-shaped support 51 can thus be adjusted. independently for each one of the spherical washers 103. This allows each upper generator-supporting plate 105 to be correctly positioned, so that the electric generator 29 resting thereon will be coaxial with the gas turbine. Any possible misalignment of the electric generator and gas turbine, for example due to different deformations of the baseplate 25 occurring during transportation from the erection and testing site or yard to final destination, can thus be offset by simply adding full face shims between spherical washers and the casing of the electric generator, without risk to fail in reaching the desired planarity.

Figure 15:
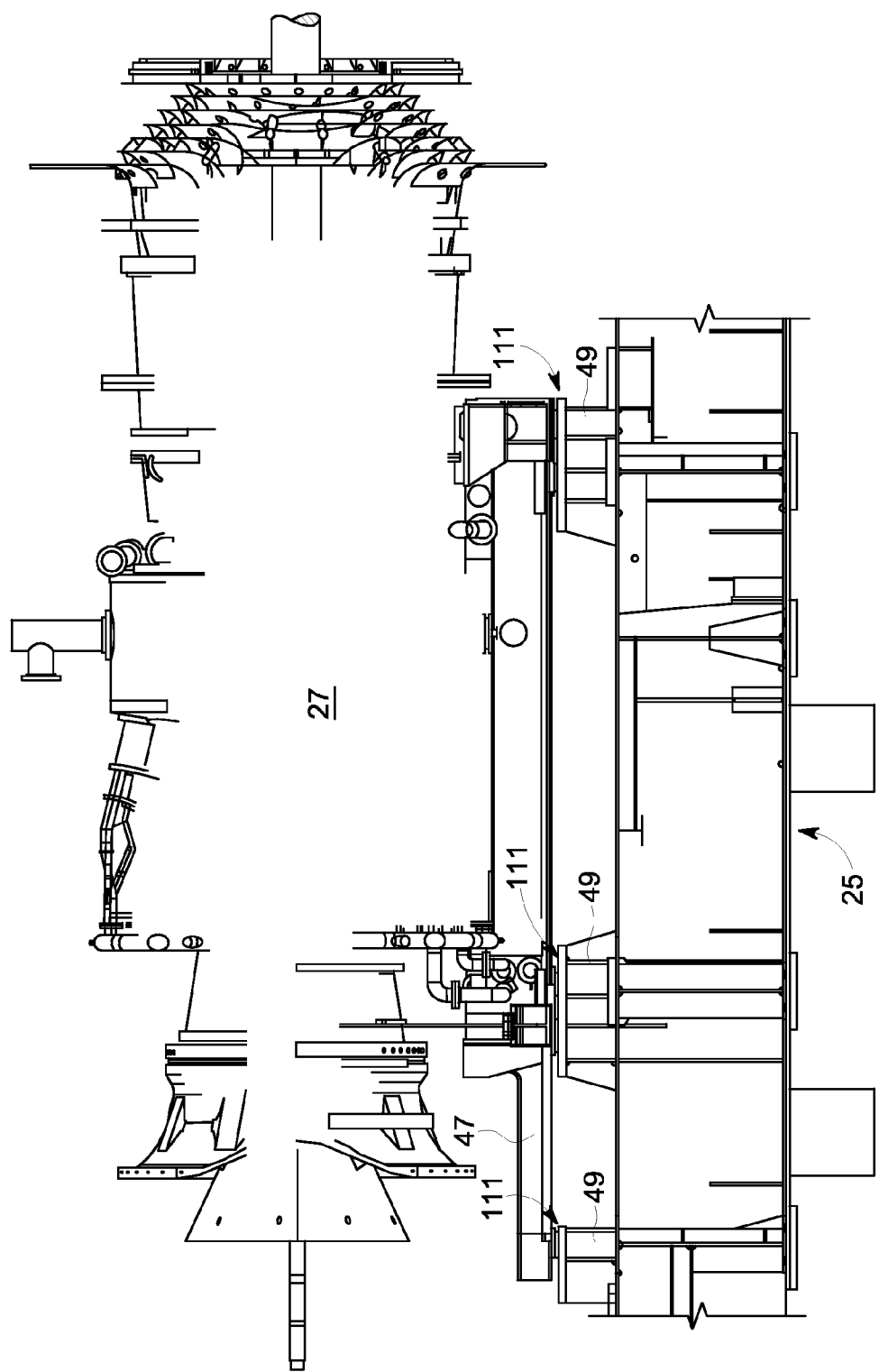
FIG. 15 illustrates a side view of the support of the gas turbine on the baseplate according to an embodiment of the present invention.

A similar spherical washer arrangement can be provided between the gas turbine 27 and the baseplate 25. In FIG. 15 spherical washers 111 interposed between the gas turbine baseplate 47 and the feet 49 are schematically shown. The spherical washers 111 are designed and arranged such that the inclination of the gas turbine baseplate 47 can be adjusted so that the gas turbine 27 is coaxial with the electric generator 29.

The modular structure described above, and in particular the baseplate 25, as well as the structure of the foundation 23, allow a gas turbine power plant including a main frame o heavy duty turbine and a load, such as in particular an electric generator, to be assembled in a manufacturing site, or erection and testing yard, tested at full speed and no load, or full speed and full load and then transported as a module by sea and/or land transportation to the final destination. For this purpose, in the erection and testing yard or manufacturing site a first foundation 23 will be constructed, The baseplate 25 will be assembled and anchored, by means of stud bolts 93, on the first foundation 23 and the entire module, including the rotary machines, the auxiliary devices and facilities, will be mounted thereon, including the outer structure 33 enveloping the gas turbine package. The machines will be axially aligned, tuned and tested.

Figure 12:
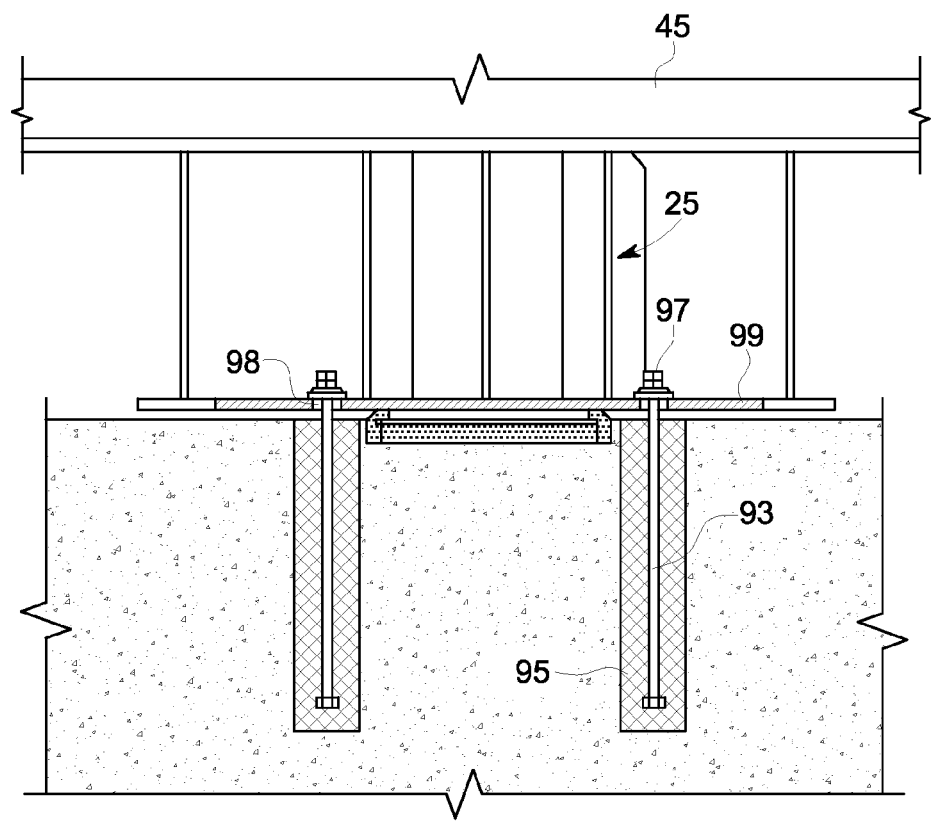
FIG. 12 illustrates a cross sectional view according to a vertical plane of a stud bolt arrangement for anchoring the baseplate on the foundation according to an embodiment of the present invention.

Once the module has been completely tested, it can be dismounted from the first foundation 23, by removing the nuts from the stud bolts 93 (see FIG. 12). Trailers 81 will be used to lift the module from the first foundation 23 and transported e.g., to a ship for sea transportation to final destination. There, the module will be lifted again by means of trailers 81 and moved over a second foundation 23, which can be identical or similar to the foundation 23 on which the module has been assembled and tested at the erection and testing yard or site. It is not essential for the two foundations 23 to be identical to one another. It suffices for the two foundations to be sufficiently similar to ensure the same dynamical and static behavior of the module. In particular, both foundations 23 must have channels for driving the trailers 81 in and out and resting surfaces for placing the primary longitudinal beams 45A-45D and the transverse beams 41 and for anchoring said beams to the foundation through sole plates and stud bolts as described above.

The above described structure allows therefore heavy duty gas turbines to be modularized and transported, thus reducing time and costs fix assembling and start-up of the gas turbine plant at final destination.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A gas turbine module, the gas turbine module comprising:
   a baseplate supporting at least one heavy duty gas turbine having a rated power of not less than 80 MW and a load drivingly connected to the at least one heavy duty gas turbine; and
   a structure surrounding the at least one heavy duty gas turbine and the load and connected to the baseplate, wherein:
   the baseplate comprises a plurality of longitudinal beams, extending parallel to a direction of a rotation axis of the at least one heavy duty gas turbine, and a plurality of transverse beams, extending transversely and spaced longitudinally along the rotation axis, wherein the plurality of longitudinal beams and the plurality of transverse beams define a primary lattice structure, on which the at least one heavy duty gas turbine and the load are placed,
   the at least one heavy duty gas turbine and the load are placed on and supported by a first pair of longitudinal beams of the plurality of longitudinal beams;
   the at least one heavy duty gas turbine is constrained to a turbine base support, wherein the turbine base support is connected to the baseplate of the gas turbine module through a plurality of feet, and the plurality of feet are constrained to the first pair of longitudinal beams; and a foundation having a planar surface of support for the baseplate, wherein the planar surface of support is discontinuous, wherein the foundation has channels running parallel to a plurality of longitudinal beams, and wherein the channels are arranged and configured for the insertion of lifting and moving trailers, wherein the foundation further comprises a plurality of side supports and an intermediate support, wherein the first pair of the plurality of longitudinal beams, on which the heavy duty gas turbine and the load are placed, rest on the intermediate support, and one of a plurality of transverse beams rests on the side supports.

2. The gas turbine module according to claim 1, wherein the load comprises an electric generator.

3. The gas turbine module according to claim 1, wherein the first pair of the plurality of longitudinal beams are located in an intermediate position in the primary lattice structure between a second pair of longitudinal beams of the plurality of longitudinal beams.

4. The gas turbine module according to claim 1, wherein the plurality of transverse beams and the plurality of longitudinal beams define a top planar surface of the baseplate.

5. The gas turbine module according to claim 4, wherein the plurality of transverse beams and the first pair of the plurality of longitudinal beams have substantially the same height and define a bottom planar surface of the baseplate, the bottom planar surface forming a rest surface on the foundation.

6. The gas turbine module according to claim 1, wherein the baseplate is divided into baseplate sections, wherein each of the baseplate sections is aligned to one another in a direction parallel to the rotation axis of the at least one heavy duty gas turbine and connected to one another to form a rigid baseplate structure.

7. The gas turbine module according to claim 6, wherein each transverse beam of the plurality of transverse beams has a length corresponding to a width of the baseplate and each longitudinal beam of the plurality of longitudinal beams is formed by a plurality of longitudinal beam portions aligned along the direction of the rotation axis of the at least one heavy duty gas turbine, each longitudinal beam portion of the plurality of longitudinal beam portions extending between respective transverse beams of the plurality of transverse beams, wherein the plurality of longitudinal beam portions of each longitudinal beam is connected to one another by welding to respective transverse beams of the plurality of transverse beams.

8. The gas turbine module according to claim 1, wherein the primary lattice structure has a plurality of substantially rectangular meshes, wherein in at least some of the plurality of substantially regular meshes, a secondary lattice structure is provided, wherein the secondary lattice structure is formed by secondary beams running parallel to the plurality of transverse beams of the primary lattice structure and the plurality of longitudinal beams of the primary lattice structure.

9. The gas turbine module according to claim 1, wherein the primary lattice structure has a plurality of substantially rectangular meshes, wherein in at least some of the plurality of substantially rectangular meshes, bracings are arranged in a plane parallel to the baseplate and are inclined with respect to both the plurality of longitudinal beams and the plurality of transverse beams.

10. The gas turbine module according to claim 1, wherein the plurality of transverse beams and the plurality of longitudinal beams forming the primary lattice structure each comprise a central web welded to upper and lower flanges.

11. The gas turbine module according to claim 1, further comprising spherical washers between the turbine base support and the plurality of feet for adjusting an inclination of the at least one heavy duty gas turbine with respect to the baseplate of the transportable gas turbine module.

12. The gas turbine module according to claim 1, further includes a plurality of auxiliary transverse connection beams provided under the at least one heavy duty gas turbine, to transversely connect the first pair of the plurality of longitudinal beams.

13. The gas turbine module according to claim 1, wherein the load is placed on a plurality of load base supports constrained to a pair of intermediate longitudinal beams of the plurality of longitudinal beams, wherein the plurality of load base supports extends parallel to the plurality of transverse beams.

14. An on-shore gas turbine plant comprising a gas turbine module comprising:

a baseplate supporting at least one heavy duty gas turbine having a rated power of not less than 80 MW and a load drivingly connected to the at least one heavy duty gas turbine; a structure surrounding the at least one heavy duty gas turbine and the load and connected to the baseplate; and a foundation, having a planar surface of support for the gas turbine module, wherein the planar surface of support is discontinuous and the foundation has channels running parallel to a plurality of longitudinal beams, wherein the channels are arranged and configured for the insertion of lifting and moving trailers, wherein the foundation further comprises a plurality of side supports and an intermediate support, wherein a pair of the plurality of longitudinal beams, on which the heavy duty gas turbine and the load are placed, rest on the intermediate support and wherein one of a plurality of transverse beams rests on the side supports.

15. The on-shore gas turbine plant according to claim 14, wherein the side supports and the intermediate support comprise recesses housing sole plates grouted in the recesses, wherein said sole plates form resting surfaces for the plurality of transverse beams and the plurality of longitudinal beams.

16. The on-shore gas turbine plant according to claim 15, wherein the foundation comprises stud bolts grouted therein and arranged for connection to the baseplate.

17. The on-shore gas turbine plant according to claim 14, wherein the baseplate comprises a plurality of shear keys, horizontally anchoring the baseplate to the foundation.

18. The on-shore gas turbine plant according to claim 17, further comprising:

a first set of shear keys, of the plurality of shear keys, designed and arranged to prevent horizontal displacement of the baseplate in one horizontal direction and allowing horizontal displacement in a second direction; and a second set of shear keys, of the plurality of shear keys, designed and arranged to prevent horizontal displacement of the baseplate in the second direction and allow horizontal displacement in the one horizontal direction.

19. The on-shore gas turbine plant according to claim 18, wherein the one horizontal direction and the second direction are orthogonal to one another, and wherein one of the horizontal direction and the second direction is substantially parallel to a gas turbine axis.

20. A method of assembling an on-shore gas turbine plant comprising a heavy duty gas turbine having a rated power of not less than 80 MW driving a load, the method comprising:

manufacturing a baseplate;

setting down the baseplate to a first foundation on an erection and testing yard, the first foundation forming a baseplate rest surface with restraining areas arranged according to a first pattern, for properly connecting the baseplate to the foundation;

assembling on the baseplate the gas turbine, the load, auxiliary facilities and a structure surrounding the heavy duty gas turbine, forming a module, wherein the structure comprises a gas turbine package;

testing the heavy duty gas turbine and the load;

removing the module from the first foundation;

transporting the module to a final destination; and setting down the module on a second foundation, wherein the second foundation forms a baseplate rest surface with second restraining areas arranged according to a second pattern, for properly connecting the baseplate to the second foundation, and the first pattern at least partly corresponds to the second pattern, wherein the first foundation and the second foundation have empty spaces for inserting, lifting, and moving trailers.

21. The method of assembling an on-shore gas turbine plant according to claim 20, wherein the heavy duty gas turbine and the load are tested at full speed, and no load.

22. The method of assembling an on-shore gas turbine plant according to claim 20, wherein the heavy duty gas turbine and the load are tested at full speed, and full load.

23. The transportable gas turbine module according to claim 3, wherein the first pair of longitudinal beams are not located symmetrically with respect to a center line extending longitudinally through the baseplate.

24. The gas turbine module according to claim 1, wherein the plurality of side supports includes one of side walls or first plinths rows and wherein the intermediate support includes one of a central wall or a second plinths row.

25. The on-shore gas turbine plant according to claim 14, wherein the plurality of side supports includes one of side walls or first plinths rows and wherein the intermediate support includes one of a central wall or a second plinths row.

* * * * *